United States Patent [19]

Yoshino et al.

[11] Patent Number: 4,609,418

[45] Date of Patent: Sep. 2, 1986

[54] HOLLOW CONTAINER OF BIAXIALLY ORIENTED SYNTHETIC RESIN ENGAGED WITH BASE CAP ON BOTTOM AND METHOD OF ENGAGING THE CAP WITH THE CONTAINER

[75] Inventors: Yataro Yoshino; Mamoru Oshida; Katsuji Mitani, all of Tokyo, Japan

[73] Assignee: Yoshino Kogyosho Co., Ltd., Tokyo, Japan

[21] Appl. No.: 755,781

[22] Filed: Jul. 17, 1985

Related U.S. Application Data

[62] Division of Ser. No. 494,704, May 16, 1983.

[51] Int. Cl.⁴ .................................................. B32B 31/00
[52] U.S. Cl. ........................................ 156/87; 156/294
[58] Field of Search ................. 156/87, 105, 293, 294, 156/557, 558, 556, 69; 53/510, 408

[56] References Cited

U.S. PATENT DOCUMENTS

| | | | |
|---|---|---|---|
| 3,481,226 | 12/1969 | Caskey | 156/87 X |
| 3,482,724 | 12/1969 | Heaton | 215/1 C |
| 3,722,725 | 3/1973 | Khetani et al. | 215/1 C |
| 3,769,135 | 10/1973 | Wallington | 156/87 X |
| 3,927,782 | 12/1975 | Edwards | 215/1 C |
| 4,138,026 | 2/1979 | Conklin | 215/12 R |
| 4,187,276 | 2/1980 | Amberg | 215/12 R |
| 4,219,124 | 8/1980 | Amberg | 215/12 R |
| 4,331,246 | 5/1982 | Sorensen | 215/12 R X |
| 4,419,176 | 12/1983 | Valimont et al. | 156/556 |
| 4,438,856 | 3/1984 | Chang | 215/12 R |

*Primary Examiner*—David Simmons
*Attorney, Agent, or Firm*—Parkhurst & Oliff

[57] ABSTRACT

A hollow container of biaxially oriented synthetic resin engaged at the bottom portion thereof with a base cap, in which a bottom portion and a body portion are biaxially oriented, said bottom portion is formed in a regular circular shape of cross section and in a spherical shape swelled downwardly, comprising a base cap having a bottom wall for supporting the lower surface of the bottom portion of said container and a peripheral wall erected upwardly from the peripheral wall of said bottom wall and capable of elastically deforming; and said base cap being watertightly engaged at the inner surface of the peripheral wall thereof with the outer surface of the peripheral wall of the lower end portion of said container and engaged with said container. This container is manufactured by a method of engaging the container with a base cap having no air vent hole. Thus, the air can be readily exhausted in case of press-fitting the bottom of the container into the cap.

8 Claims, 9 Drawing Figures

FIG. 1
FIG. 2
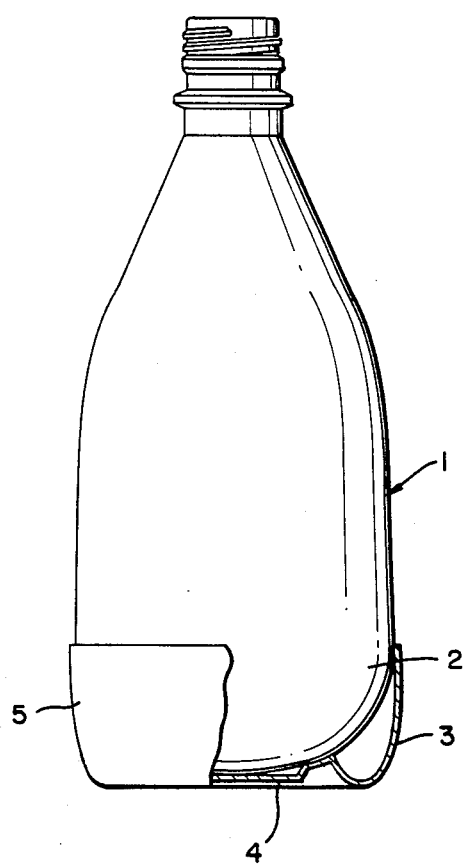
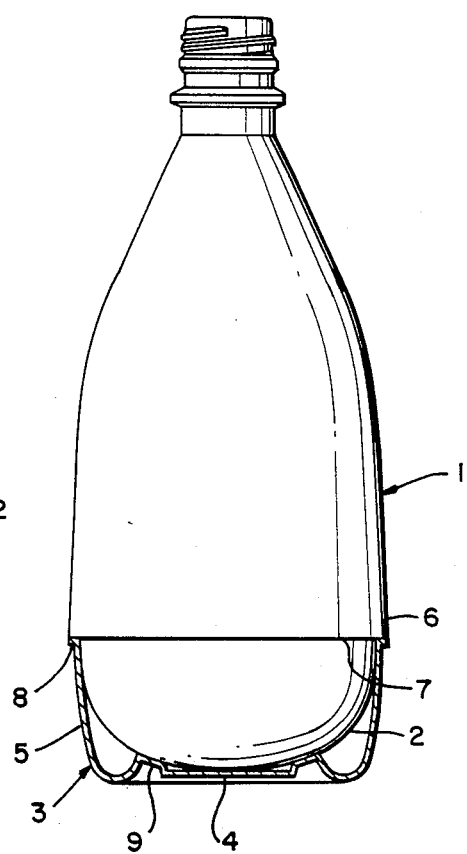

FIG. 3
FIG. 4
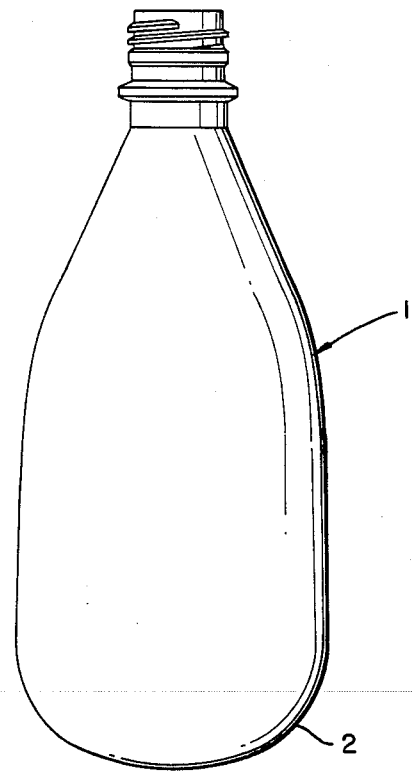
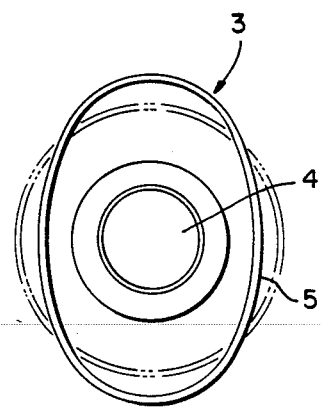
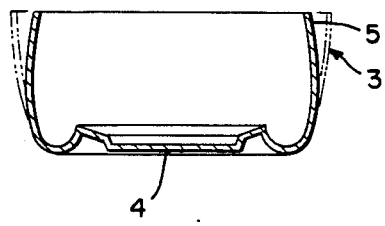

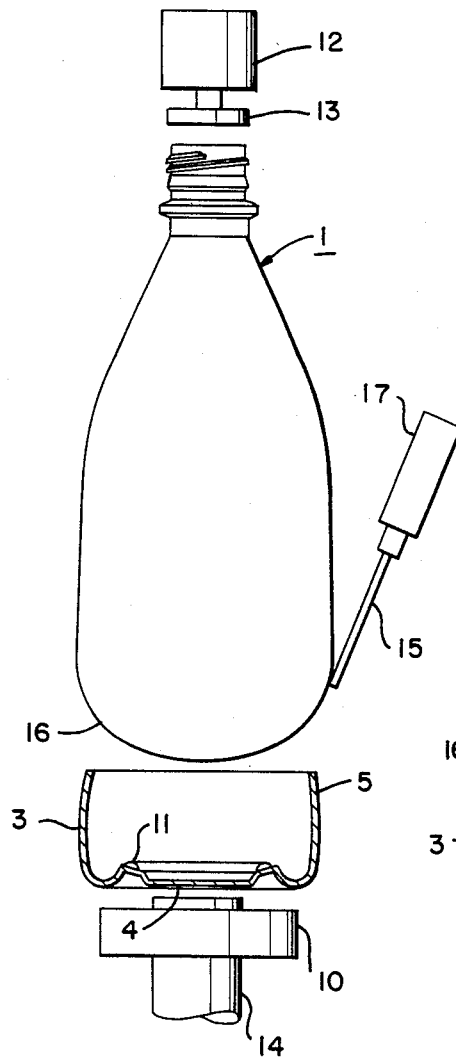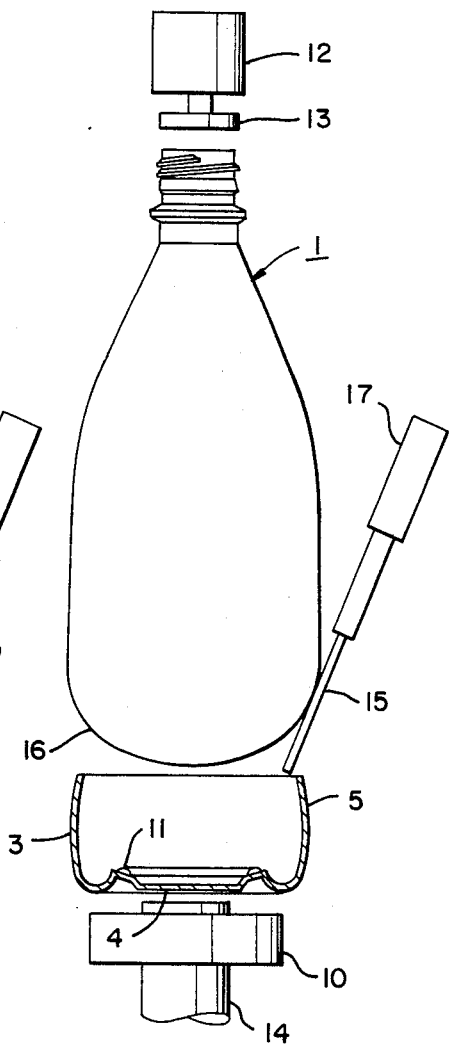

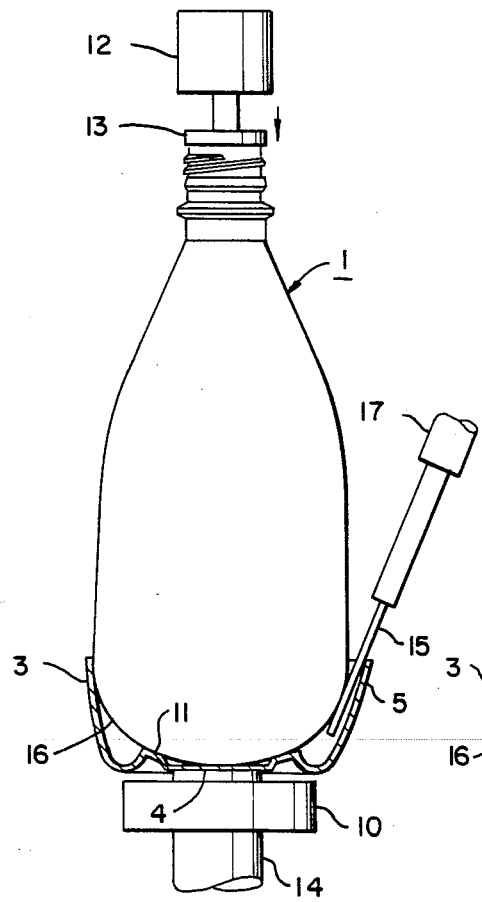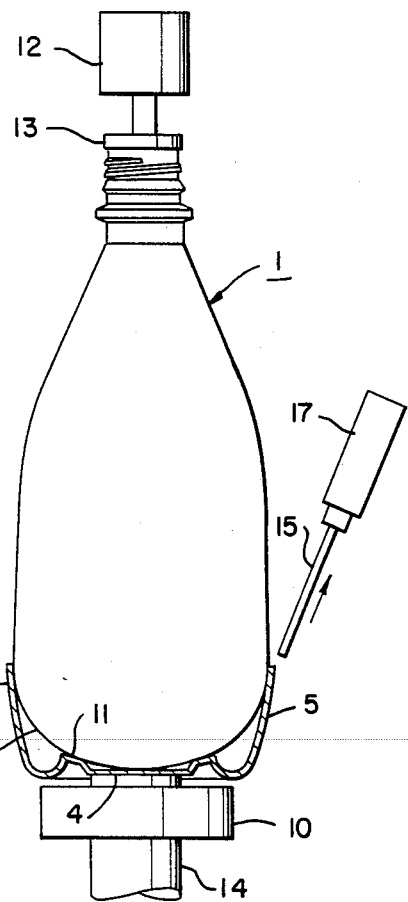

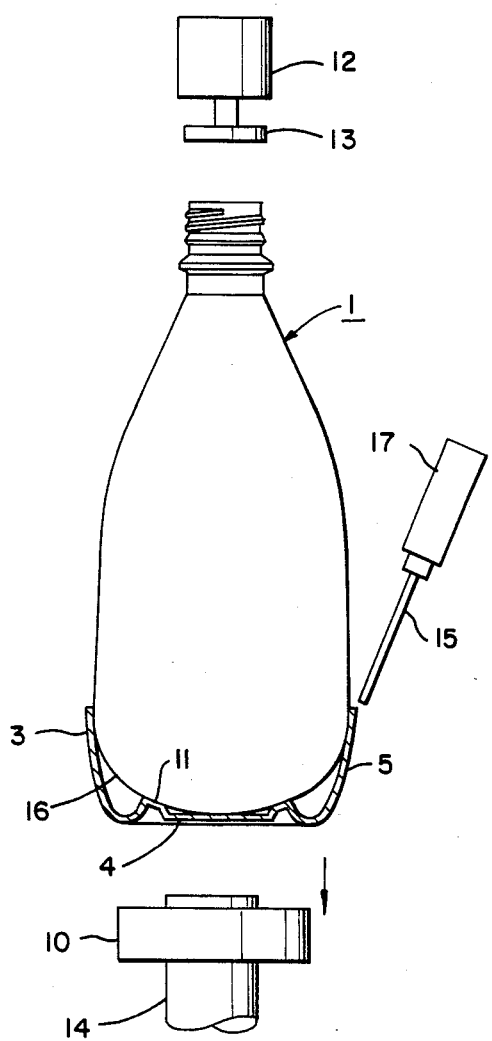

HOLLOW CONTAINER OF BIAXIALLY ORIENTED SYNTHETIC RESIN ENGAGED WITH BASE CAP ON BOTTOM AND METHOD OF ENGAGING THE CAP WITH THE CONTAINER

This is a division of application Ser. No. 494,704 filed May 16, 1983.

BACKGROUND OF THE INVENTION

This invention relates to a hollow container of biaxially oriented synthetic resin engaged with a base cap on the bottom of the container and a method of engaging the cap with the bottom of the container.

Containers of biaxially oriented synthetic resin have been recently used in a wide range of applications in great quantity. When the bottom of this container is disposed horizontally with respect to the axis of the container body as is used ordinarily in this case, the biaxial orientation of the bottom wall part of the container becomes difficult in the blow-molding step. It is preferred in order to effectively biaxially orient the bottom wall part of the container to swell the bottom wall part downwardly in a spherical shape. However, the container causes, if the bottom of the container is formed in a spherical shape, difficulty in erecting and stationarily standing the container since the bottom is spherical. To eliminate this difficulty, a base cap is engaged and disposed as a trestle for erecting and steadily standing the container in a vertical position. When an air vent is not provided at the cap, high pressure air remains between the cap and the bottom of the container due to the introduction of the bottom into the cap in case of engaging the bottom of the container within the cap, thereby causing the cap to be readily removed from the container due to the operation of the high pressure air thus produced. For the purpose, an adequate number of air vent holes are formed at the cap. When the container with the cap is, for example, submerged, after liquid is filled in the container, in chilled water to cool the filled liquid by a consumer, the chilled water is fed through the vent holes into the space between the bottom of the container and the cap, whereby water is dropped from the vent holes after the container is raised from the chilled water and cannot be dried from the water for a long period of time.

In case of engaging the container body with the base cap, the bottom of the container is mechanically press-fitted into the cap. In this case, since the press-fitting step is performed for a short time, the air in the cap loses its escaping space due to the depression of the bottom of the container into the cap, thereby frequently causing the cap to be incompletely engaged with the container.

SUMMARY OF THE INVENTION

Accordingly, an object of the present invention is to provide a hollow container of biaxially oriented synthetic resin engaged with a base cap having no air vent hole which can eliminate all the aforementioned drawbacks and disadvantages of the conventional container.

Another object of the present invention is to provide a hollow container of biaxially oriented synthetic resin engaged with a base cap which can readily exhaust the air in the cap in case of press-fitting the bottom of the container into the cap in a short time even without air vent holes formed at the cap.

Still another object of the present invention is to provide a method of engaging a hollow container of a biaxially oriented synthetic resin with a base cap having no air vent hole.

BRIEF DESCRIPTION OF THE DRAWINGS

The above and other related objects and features of the invention will be apparent from a reading of the following description of the disclosure found in the accompanying drawings and novelty thereof pointed out in the appended claims.

FIG. 1 is a fragmentary sectional view showing the first embodiment of a hollow container of biaxially oriented synthetic resin engaged with a base cap at the bottom of the container according to the present invention;

FIG. 2 is a fragmentary sectional view similarly showing the second embodiment of the hollow container of the present invention;

FIG. 3 is an explanatory view of the first embodiment of the method of engaging the bottom of the container with the base cap according to the present invention;

FIG. 4 is a plan view showing the shape of the base cap in FIG. 3;

FIGS. 5 to 9 are explanatory views showing the second embodiment of the method for engaging according to the present invention, wherein FIG. 5 is a view showing the state that the container, the base cap and the air vent rod are disposed; FIG. 6 is a view showing the state that the air vent rod is operated; FIG. 7 is a view showing the operating state of the air vent rod and the adhered state of the container with the cap, FIG. 8 is a view showing the state that the rod is pulled, and FIG. 9 is a view showing the state that the engagement of the container with the cap is completed.

DESCRIPTION OF THE PREFERRED EMBODIMENTS

The hollow container of biaxially oriented synthetic resin engaged with a base cap and a method of engaging the hollow container with the base cap of the present invention will now be described in more detail with reference to the accompanying drawings.

FIG. 1 shows a first embodiment of the hollow container of biaxially oriented synthetic resin engaged with a base cap according to the present invention. Reference numeral 1 designates a synthetic resin container molded by biaxial orientation, the bottom of which is formed in a regular circle in cross section and which is swelled downwardly in a spherical shape.

Reference numeral 3 depicts a base cap engaged with the bottom portion 2 of the container 1, which cap has a function as a trestle for supporting the container 1 in an erected state. The cap 3 is formed by standing an elastically deformable peripheral wall 5 integrally from the peripheral edge of a bottom wall 4 for supporting the lower surface of the bottom portion 2 of the container 1 in such a manner that the inner upper surface of the peripheral wall 5 is watertightly engaged with the outer surface of the peripheral wall part of the bottom portion 2 of the lower body of the container 1.

In the embodiment described above, the peripheral wall of the cap 3 is elastically deformable, and a temporary air vent hole can be accordingly formed between the cap and the peripheral wall of the bottom portion of the container by elastically deforming the peripheral wall of the cap even without any air vent hole at the cap when the bottom portion is engaged within the cap. Since the temporary air vent hole can be further eliminated by the elastic recovery of the peripheral wall 5 of the cap 3, it does not take a great deal of time to dry chilled water filled in the cap even when the container with the cap is submerged in the chilled water as is the case when vent holes are perforated at the cap. In addition, the cap can protect the bottom 2 of the container 1 and can steadily hold erect the container having a spherical bottom portion.

FIG. 2 shows a second embodiment of the hollow container of biaxially oriented synthetic resin engaging a bottom portion of the container with a base cap according to the present invention. The lower end portion 6 of the body of the container 1 is formed with a step 7 which is recessed inside, and the bottom portion 2 of the container 1 is swelled downwardly in a spherical shape from the step 7.

A base cap 3 is engaged with the outer surface of the bottom 2 of the container 1. The cap 3 is formed with a peripheral wall 5 elastically deformably erected from the peripheral edge of the bottom wall 4 in the same manner as the first embodiment, and an outward flange 8 is formed at the upper end of the wall 5. The flange 8 has a width equal to the step 7. A projected strip 9 concentric with the wall 5 is circumferentially formed at the bottom wall of the cap 3.

In the embodiment described above, the outward flange 8 is formed at the upper end of the peripheral wall of the base cap. Thus, even if the peripheral wall is elastically deformably formed in a thin wall, the end on the peripheral wall can hardly deform, and the bottom portion of the container can be accordingly readily engaged with the cap, and since the outer diameter of the flange is substantially equal to that of the lower end of the container body, the flange and the lower end of the body becomes the same plane, so that the flange does not become obstacle.

Since the peripheral wall of the cap is formed of elastically deformable synthetic resin material, the peripheral wall can be, even if the bottom portion of the container is slightly increased in diameter due to dimensional error, elongated, with the result that the bottom portion can be effectively engaged with the cap.

A method of engaging the bottom portion of the container with the base cap will now be described in more detail.

Referring now to FIGS. 3 and 4, a base cap 3 is stood at the peripheral wall 5 thereof from the container 1 within the cap 3, the upper cross sectional shape of the peripheral wall of the cap 3 is pressed inwardly at both right and left sides to form an elliptical shape, the lower surface of the bottom portion 2 of the container 1 is contacted with the upper end of the short diameter portion of the peripheral wall of the base cap 3, the container 1 is pressed down as it is, and the peripheral wall of the cap is deformed in this manner, thereby engaging the bottom portion 2 of the container 1 with the cap 3.

In this manner, the inner surface of the long diameter portion of the peripheral wall of the cap is approached from the state to be isolated from the outer peripheral surface of the bottom portion of the container to the bottom portion at the long diameter portion as the bottom portion enters into the cap, and when the bottom portion is completely engaged within the cap, the long diameter portion is intimately contacted with the outer peripheral surface of the bottom portion. Accordingly, an air exhaust hole is formed between the long diameter portion and the outer peripheral surface of the bottom portion of the container, and the air exhaust hole is eliminated by the engagement of the bottom portion within the cap. Thus, even if the bottom portion of the container is engaged within the cap in a short time, high pressure air is not allowed to remain in the cap, but the engagement of the bottom portion of the container with the cap can be perfected.

The peripheral wall of the base cap may be temporarily formed in an elliptical shape by initially forming it in a regular circular shape in cross section and then pressing both right and left sides in case of engaging the bottom portion of the container within the cap.

In the method of the above embodiment, the bottom portion of the container is engaged within the cap after the cap is deformed in the elliptical shape of cross section. However, the cap is, on the contrary, formed in a regular circular shape in cross section, both right and left sides of the bottom portion of the container may be pressed inwardly against the elasticity of the bottom portion in an elliptical shape of cross section, and the bottom portion may be engaged within the cap. In this case, when the depression of both the right and left sides of the bottom portion of the container is simultaneously released upon engagement of the bottom portion within the cap, the bottom portion is recovered, and the outer peripheral surface can be intimately contacted with the cap.

According to the above described method of the present invention, even if the bottom portion of the container is pressed into and engaged within the cap in a short time, the air in the cap does not lose its escaping space, the engagement of the bottom portion within the cap does not accordingly become incomplete, and no hole is formed for exhausting the air at the cap. Therefore, even when the container with the base cap filled with liquid is submerged in chilled water and is cooled, the water filled in the cap does not continuously drop.

FIGS. 5 to 9 show the other preferred embodiments of the method of engaging the bottom portion of a container with a base cap according to the present invention.

As shown in FIG. 5, a container 1 is held at a predetermined position, a base cap 3 on which a hot melt 11 is coated on the bottom wall 4 thereof is placed on a lifting jig 10 which is disposed directly under the container 1, and a retaining jig 13 which is mounted at the end of a piston rod of a depressing cylinder 12 is disposed to operate a depressing force to the container 1.

The jig 10 is raised by a lifting rod 14 from this state to raise the cap 3 toward the container 1, and the jig 13 is simultaneously lowered to contact it with the upper end of the container, thereby holding the container so as not to upwardly displace even if the lifting force is applied to the container.

The cap 3 thus upwardly displaced toward the container 1 is intimately engaged at the opening of the peripheral wall 5 of the cap 3 with the lower end portion 6 of the body of the container 1, whereby the hot melt 11 is urged to the bottom portion 14 of the container 1 as shown in FIG. 7 while the assembling attitude of the cap 3 with the container 1 is maintained adequately.

When the bottom portion 16 of the container 1 is further urged to the cap 3, the cap 3 is associated with the container 1 in the state that a sufficiently fine air vent rod 15 is disposed between the cap 3 and the container 1, the rod 15 is pulled between the wall 5 and the container 1 at the position where the bottom wall 4 of the cap 3 coated with the hot melt 11 is urged to the bottom portion 16 of the container.

More particularly, the space formed between the container 1 and the cap 3 is not hermetically sealed since the rod 15 is disposed between the peripheral wall 5 of the cap 3 and the container 1, the space is hermetically sealed after the bottom wall 4 coated with the hot melt 11 is urged to the bottom portion 16 of the container and the rod 15 is then pulled from between the container 1 and the wall 5.

Since the rod 15 is pulled at the timing when the bottom wall 4 coated with the hot melt 11 is urged to the bottom portion 16 of the container, the volume formed between the container 1 and the cap 3 may be increased, but may not be decreased, and the pressure higher than the atmospheric pressure will not accordingly be produced in the space thus sealed.

The steps of the method of engaging the bottom portion of the container with the base cap of the embodiment according to the present invention will now be described in more detail with reference to the accompanying drawings. In FIG. 5, the container 1 is mounted between the jig 13 mounted on the cylinder 12 and the jig 14, and the cap 3 coated with the hot melt 11 is placed on the bottom wall 4 on the jig 10.

An air vent rod 15 is forwardly and reversely telescopically disposed in the vicinity of the container 1 in a telescopic cylinder 17.

When the container 1 and the cap 3 are completely set in the state as shown in FIG. 5, the cylinder 17 is first operated as shown in FIG. 6 to forwardly move the rod 15, and when the cap is engaged with the container 1, the rod 15 is disposed between the peripheral wall 5 of the cap 3 and the container 1.

When the rod 15 is completely forwarded, the cylinder 12 and the rod 14 are operated to prevent the upward displacement of the container 1 by the jig 13, the jig 10 is simultaneously raised to engage the cap 3 with the lower end including the bottom portion 16 of the container 1, the jig 10 is raised until the bottom wall 4 coated with the hot melt 11 is urged to the bottom portion 16 of the container 1 as shown in FIG. 6, and is stopped at this position.

This upward movement of the jig 10 may be set by increasing the lifting force acting on the jig 12 through the container 1 to the set value, or may be performed by the projecting distance of the rod 14.

When the jig 10 reaches the upper limit so that the bottom wall 4 coated with the hot melt 11 is urged to the bottom portion 16 of the container, the cylinder 17 is operated in the direction opposite to the above operation as shown in FIG. 8, the rod 15 is retracted, and is removed from between the container 1 and the peripheral wall 5.

The peripheral wall 5 which has been elastically deformed as shown in FIG. 7 up to that time due to the removal of the rod 15 from between the container 1 and the peripheral wall 5 is elastically recovered to intimately contact the inner peripheral surface of the opening with the lower end portion of the body of the container 1, thereby hermetically sealing the space formed between the container 1 and the cap 3.

When the rod 15 is removed from between the container 1 and the peripheral wall 5, the cylinder 12 and the rod 14 are operated in the direction reverse to the previous operation as shown in FIG. 9, the jig 13 and the jig 10 are retracted and reset, thereby completing the engagement of the cap 3 with the container 1.

In the above description of steps of the method of the present invention, the timing of pulling the rod 15 is set at the time of operating the urging force of the jig 10. However, this timing of removing the rod 15 is not limited only to the above-mentioned time. For example, the timing of removing the rod 15 may be any time after the bottom wall 4 coated with the hot melt 11 is urged to the bottom portion 16 of the container 1 and the container 1 is adhered to the cap 3 with the hot melt 11.

In the state that the bottom wall 4 coated with the hot melt 1 by the jig 10 is urged to the bottom portion 16 of the container, the volume of the space formed between the container 1 and the cap 3 becomes the minimum value since the urging force is acted to the cap 3 to slightly elastically deform the cap and the introducing distance of the lower portion of the container into the cap 3 becomes larger than that in the case that the container is not lifted by the jig 10.

Accordingly, when the rod 15 is removed to seal the space between the container 1 and the cap 3 at the time that the urging force of the cap by the jig 10 is operated, the cap 3 is slightly elastically recovered as the lifting force of the jig 10 is released, thereby causing the volume of the space sealed between the container 1 and the cap 3 to be slightly increased to generate negative pressure in the space.

The negative pressure generated between the container 1 and the cap 3 is very small, but the negative pressure creates a force for urging the cap 3 and particularly the bottom wall 4 of the cap 3 to the bottom portion 16 of the container 1, thereby causing the hot melt 11 to be solidified. Thus, the bottom wall 4 can be held in the state urged to the bottom portion 16 of the container while the bottom portion 16 is bonded fixedly to the bottom wall 4. Accordingly, the bottom portion 16 may be preferably fixedly bonded with the hot melt 11 to the bottom wall 4.

According to the method of engaging the base cap with the container of this embodiment as described above, the space sealed between the container 1 and the cap 3 may be formed without producing the pressure larger than the atmospheric pressure, thereby preferably performing the fixed bonding of the cap 3 to the container 1 with the hot melt 11 and preventing the deterioration in the engagement of the cap 3 with the container 1.

Further, since the space formed between the container 1 and the cap 3 is completely sealed, cleansing solution or dusts are not entirely introduced into this space, thereby allowing the shape of the container to readily perform the internal cleaning and eliminating the sanitary inconvenience in case of recovering and reusing the container.

Moreover, since the rod 15 may have a thickness of the degree to form a gap, through which the air may pass between the container 1 and the peripheral wall 5 as shown in FIG. 7, the engaging attitude of the body of the container 1 will not become defective in the engagement of the cap 3 with the container 1 even if the rod 15 is disposed between the container 1 and the peripheral wall 5, but the container can be engaged with the cap while the stable mutual attitude is maintained.

What is claimed is:

1. A method of engaging a hollow container of biaxially oriented synthetic resin at the bottom portion of the shape of regular circular cross section and swelled downwardly in a spherical shape with a base cap erected with the peripheral wall from the peripheral wall of said bottom wall comprising the steps of;

forming the peripheral wall of said base cap in an elastically deformable state, forming the upper cross sectional shape of said peripheral wall in an elliptical shape by pressing inwardly both right and left sides thereof, contacting the upper end portion of the short diameter portion of the peripheral wall of said base cap with the lower surface of the bottom portion of said container, pressing said container as it is and engaging the outer surface of the bottom portion of said container with said base cap while deforming the peripheral wall of said base cap.

2. A method according to claim 1, wherein said base cap has no hole.

3. A method of engaging a hollow container of biaxially oriented synthetic resin at the bottom portion of the shape of regular circular cross section and swelled downwardly in a spherical shape with a base cap erected with the peripheral wall from the peripheral edge of the bottom wall elastically deformably comprising the steps of:

engaging both right and left sides of the bottom portion of said container in elliptical shape of cross section by pressing inwardly against the elasticity of said bottom portion within said base cap, and engaging the outer upper periphery of the bottom portion to the outer surface of the lower end portion of said body portion intimately with the inner surface of the wall of said base cap due to the recovery of the bottom portion.

4. A method of engaging a hollow container of biaxially oriented synthetic resin with a base cap comprising the steps of:

disposing an air vent rod between the bottom portion swelled downwardly in a spherical shape of said container and an elastically deformable peripheral wall of said base cap erected with the peripheral wall from the peripheral edge of the bottom wall, moving said base cap and said container to engage said base cap with the bottom portion of said container, and removing said rod between the bottom portion of said container and the peripheral wall of said base cap when the bottom portion of said container is urged to the bottom wall of said base cap.

5. The method according to claim 4, wherein a hot melt for fixedly bonding the bottom of said container is coated on the bottom wall of said base cap.

6. The method according to claim 4, wherein said base cap is raised toward the bottom portion of said container by a lifting jig.

7. The method according to claim 4, wherein said container is held so as not to displace upwardly by a retaining jig even if upwardly urging force is operated to the container by the rise of said base cap.

8. The method according to claim 4, wherein said rod has a diameter sufficiently thin to be inserted between the bottom portion of said container and the peripheral wall of said base cap.

* * * * *